(12) United States Patent
Sorum et al.

(10) Patent No.: US 6,516,741 B1
(45) Date of Patent: Feb. 11, 2003

(54) LEAK PROOF APPARATUS FOR MOUNTING COMPONENTS TO PANELS

(75) Inventors: Robert D. Sorum, Caledonia, MI (US); Curtis A. Trudeau, Caledonia, MI (US); Gary L. Schafer, Shelbyville, MI (US)

(73) Assignee: Hadley Products, Grandville, MI (US)

( * ) Notice: Subject to any disclaimer, the term of this patent is extended or adjusted under 35 U.S.C. 154(b) by 35 days.

(21) Appl. No.: 09/659,371

(22) Filed: Sep. 12, 2000

(51) Int. Cl.[7] .............................. G10K 9/22; F16L 15/04
(52) U.S. Cl. ................ 116/137 R; 285/205; 285/142.1; 285/192; 248/475.1
(58) Field of Search .............................. 248/475.1, 466; 277/630; 403/408.1, 335, 336, 337, 338; 116/137 R, 147, 138, 139, 142 FP, 142 FV; 285/205, 206, 194, 142.1, 192

(56) References Cited

U.S. PATENT DOCUMENTS

| | | | | |
|---|---|---|---|---|
| 1,449,211 A | * | 3/1923 | Baker ..................... 116/137 R |
| 1,618,720 A | * | 2/1927 | Moore ......................... 222/91 |
| 1,755,104 A | * | 4/1930 | Deierlein .................... 285/208 |
| 1,874,027 A | * | 8/1932 | Condon ...................... 362/494 |
| 1,899,731 A | * | 2/1933 | Scofield et al. ........ 251/129.16 |
| 2,084,674 A | * | 6/1937 | Down ..................... 116/137 R |
| 2,259,179 A | * | 10/1941 | Souer ...................... 248/475.1 |
| 2,558,328 A | * | 6/1951 | Winslow ................. 248/475.1 |
| 2,594,013 A | * | 4/1952 | Hahn .......................... 116/139 |
| 2,793,651 A | * | 5/1957 | Gomez ....................... 137/316 |
| 2,914,988 A | * | 12/1959 | O'Shei ..................... 248/475.1 |
| 2,918,895 A | * | 12/1959 | Buell ..................... 116/142 R |
| 2,999,663 A | * | 9/1961 | Anderson ................ 248/475.1 |
| 3,045,551 A | * | 7/1962 | Bonano ...................... 359/508 |
| 3,104,120 A | * | 9/1963 | Myers ...................... 285/154.1 |
| 3,181,899 A | * | 5/1965 | McKnight, Jr. .......... 285/139.2 |
| 3,188,641 A | * | 6/1965 | Gergely ....................... 343/715 |
| 3,781,043 A | * | 12/1973 | Hagmann ................... 285/363 |
| 4,031,771 A | * | 6/1977 | Daly et al. ................ 74/490.15 |
| 4,091,865 A | * | 5/1978 | Babish et al. ................. 165/95 |
| 4,164,525 A | * | 8/1979 | Bernecker .................. 261/41.4 |
| 4,171,678 A | * | 10/1979 | Palm ..................... 116/142 FP |
| 4,264,143 A | * | 4/1981 | Manzoni ..................... 359/874 |
| 4,278,227 A | * | 7/1981 | Davis et al. ................ 248/487 |
| 4,401,326 A | * | 8/1983 | Blair .......................... 285/318 |
| 4,492,392 A | * | 1/1985 | Woods et al. ............... 285/119 |
| 4,556,173 A | * | 12/1985 | Pausch et al. ......... 239/533.13 |
| 4,613,169 A | * | 9/1986 | Engelhart ................ 285/139.2 |
| 5,190,408 A | * | 3/1993 | Ozeki et al. ............. 405/154.1 |
| 5,433,487 A | * | 7/1995 | Kuhn et al. .............. 285/136.1 |
| 5,482,329 A | * | 1/1996 | McCall et al. ................ 285/39 |
| 5,971,444 A | * | 10/1999 | Hawkins ..................... 285/206 |
| 6,220,716 B1 | * | 4/2001 | Asaka ......................... 359/871 |
| 6,260,854 B1 | * | 7/2001 | Lemon ........................ 277/609 |

* cited by examiner

Primary Examiner—Diego Gutierrez
Assistant Examiner—R. Alexander Smith
(74) Attorney, Agent, or Firm—Warner Norcross & Judd LLP (57) ABSTRACT

A leak-proof assembly for mounting an air horn on a truck cab roof. The mounting includes a threaded portion extending through the roof, a flange extending circumferentially around the fitting, and a horn stud portion. Concentric seals, adjacent the threaded portion provide a redundant watertight compression seal against the roof. A nut is mounted on the threaded portion and also includes an o-ring. Upon tightening, the two concentric seals provide leak proof seals around the hole defined by the body panel. The mounting defines an internal air passage so that the horn can be operated by a source of compressed air attached to the threaded portion from the vehicle interior.

19 Claims, 9 Drawing Sheets

LEAK PROOF APPARATUS FOR MOUNTING COMPONENTS TO PANELS

BACKGROUND OF THE INVENTION

The present invention relates to panel mounting assemblies, and more particularly to a leak proof fitting for mounting components to exterior vehicle body panels.

Figure 1:
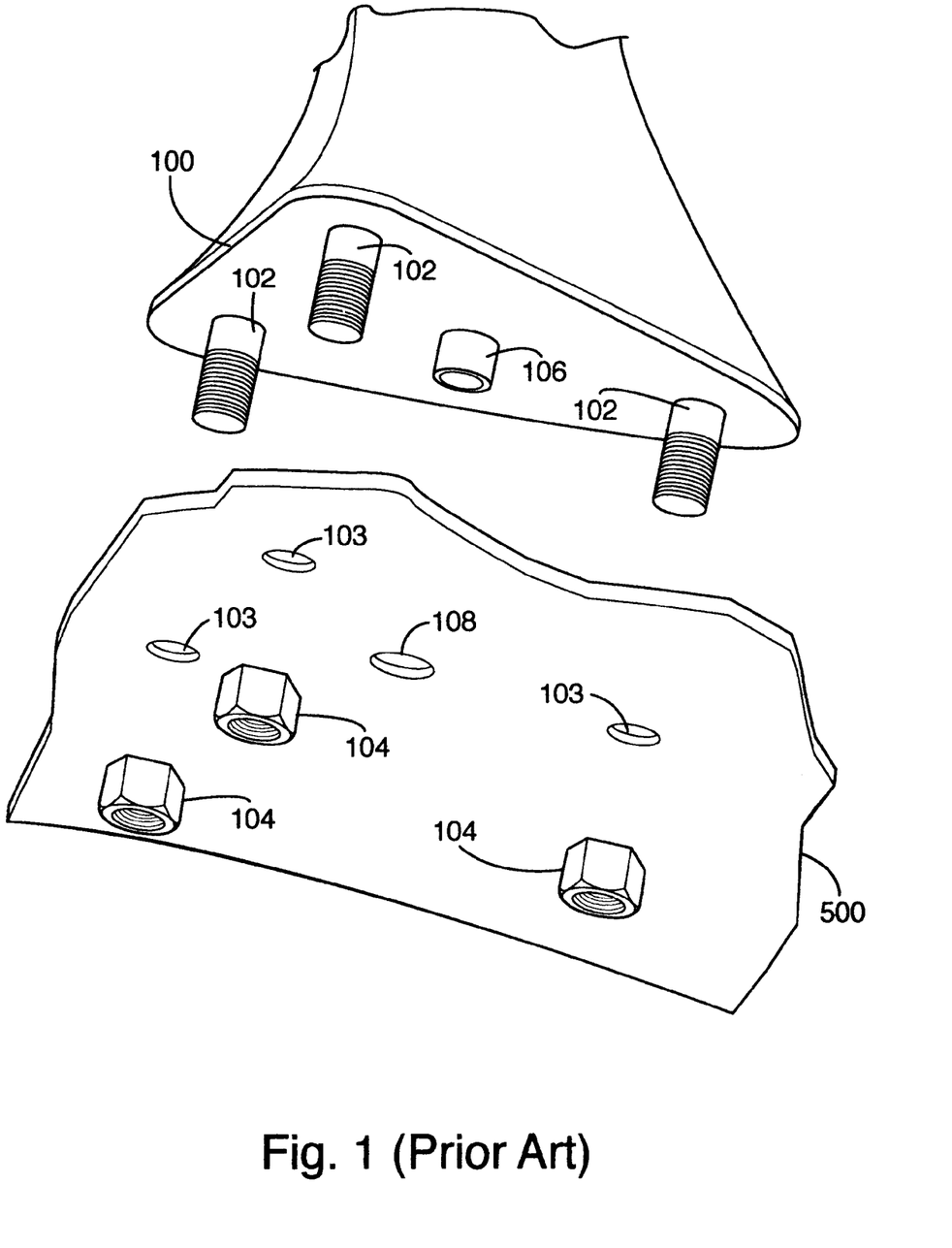
FIG. 1 is a perspective exploded view of a prior art mount and associated body panel.

Assemblies for mounting components, such as horns, lights, speakers, and the like, to exterior body panels of vehicles are well known. Mounting assemblies typically are integrated with mounted components. For example, as illustrated in FIG. 1, prior art components have a planar base 100 with multiple fasteners, such as threaded studs 102, and wiring conduit 106 protruding from the planar base. To mount the component to the body panel, holes 103 and 108 are drilled through the body panel 500. Studs 102 and wiring conduit 106 are placed through the panel holes 103 and 108, respectively, and nuts 104 secure the studs and consequently the horn, to the body panel.

While providing a stable mounting configuration, the mounting assembly of the prior art creates several problems. First, the holes in the panel must be sealed with a sealant, such as silicone to prevent water or other fluids from leaking through the holes to the other side of the body panel—a situation that can be especially costly if liquids leak into and damage the interior of the vehicle. The application of the sealant is costly and labor intensive because it requires extensive testing to ensure that the sealing is satisfactory. The application of sealant is very imprecise, thus the possibility of sealant accidentally entering the internal cavities of a component and causing improper functioning of the component is increased.

Second, the precise drilling of the holes through the body panels to accurately align the studs of the mounted component is critical because misdrilled holes can be aesthetically disastrous. Unfortunately, precision drilling is labor intensive and adds unnecessary production costs.

A third problem with prior mounting assemblies is that mounting the components to curved surfaces is difficult. With two, three, or more points of attachment, that is the studs, the mounted component many times ends up mounted off-canter thus ruining the aesthetics of the mounted component.

A fourth problem associated with conventionally mounted components is that the attachment and serviceability of components is unnecessarily burdensome. To install a component, the installer must position the studs through the holes on one side of the body panel, then the installer must go to the opposite side of the panel to install and tighten the nuts. To remove components, a service person must remove the nuts from the studs on one side of the body panel, such as the interior of the cab of a vehicle. This usually requires removal of a headliner or interior upholstery to access the nuts. Then, the service person must go to the other side of the body panel—typically the exterior of the vehicle cab—to pull the component off from the body panel. Of course, removing and replacing the components includes the added burden of resealing the mounting assembly to prevent leakage.

SUMMARY OF THE INVENTION

The aforementioned problems are overcome in the present invention comprising a leak-proof mounting for an air horn on a vehicle. The mounting includes three portions—a lower stud, a mounting plate, and an upper stud. In the preferred embodiment, the lower and upper studs and the mounting plate are portions of a unitary piece. The lower stud is adapted to extend through a vehicle panel, such as a cab roof; and the lower stud includes two compression seals placed concentrically around the lower stud for forming water-tight seals against the exterior of the panel. The upper stud is adapted to receive an air horn and includes a seal for forming an air-tight seal against the horn. The mounting plate cooperates with the stud(s) to retain the air horn in position without the use of fasteners extending through the panel. The lower and upper studs define an air passage so that air can be supplied to the horn by connecting a source of pressurized air to the lower stud on the interior of the panel.

The lower stud on the interior of the panel accepts a fastening nut which may be tightened down to pull the mounting plate against the exterior of the panel. This causes the two compression seals to compress against the exterior of the panel to form a leak proof seal about the lower stud. The fastening nut may also be outfitted with a compressible o-ring to provide additional leak protection and to provide additional locking forces to secure the nut against the panel.

In another aspect of the invention, a unique washer provides leak protection around the lower stud portion extending through a vehicle panel. The washer surrounds the lower stud and includes seals on the washer's top and bottom surfaces.

These and other objects advantages and features of the invention will be more readily understood and appreciated by reference to the detailed description of the preferred embodiments and the drawings.

DETAILED DESCRIPTION OF THE PREFERRED EMBODIMENT

Figure 2:
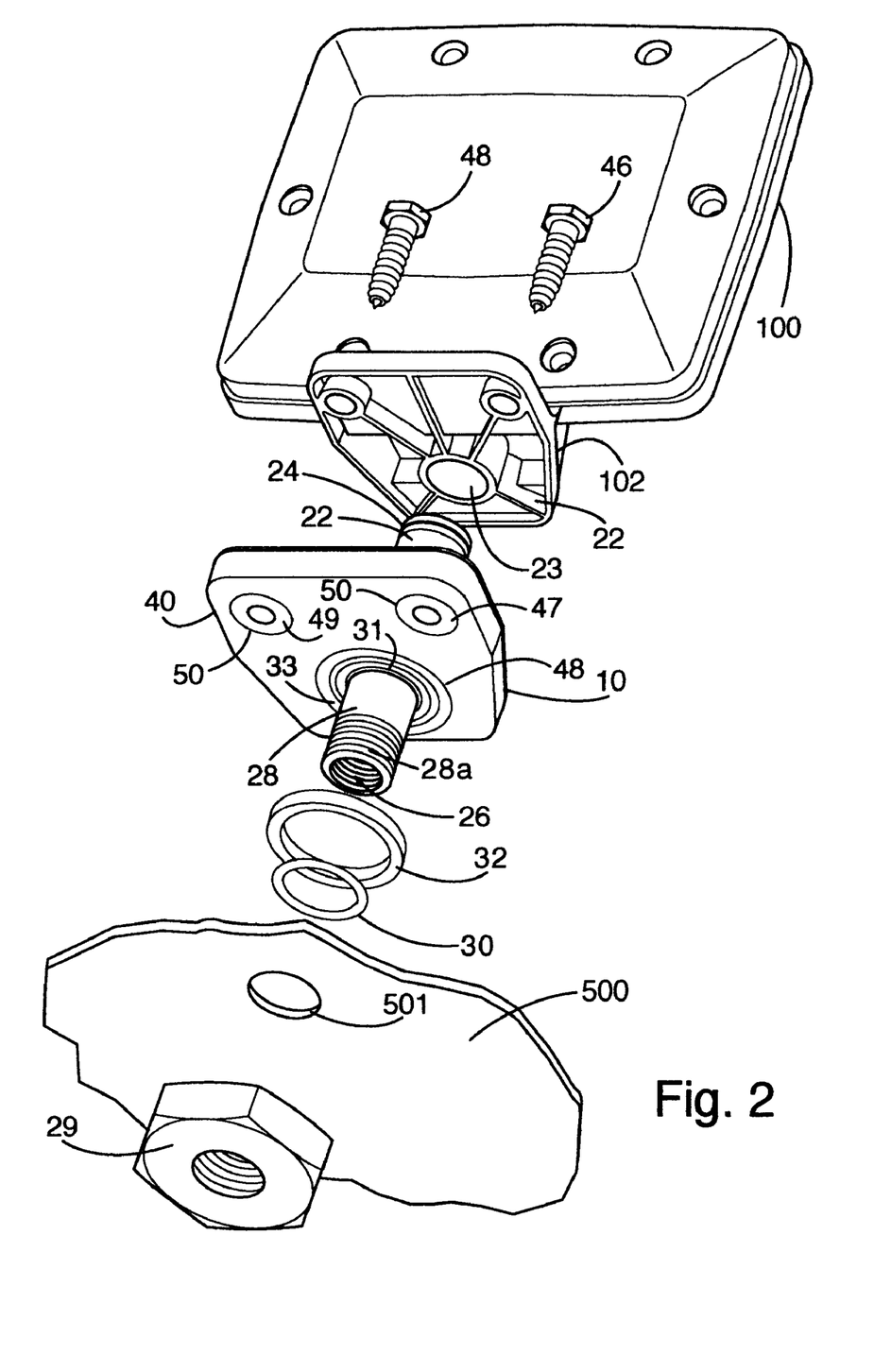
FIG. 2 is a perspective view of the mount of the present invention and a horn base to be mounted thereon.

The preferred embodiment of the leak proof mounting assembly of the present invention is depicted in FIG. 2 and generally designated 10. The assembly mounts the base 102 of a trumpet horn 100 to the roof panel 500 of a truck. The mount 10 is attached to the roof panel 500 by placing lower stud 28 through body panel aperture 501, and threading onto the threaded portion 28a the fastening nut 29. Tightening the fastening nut 29 compresses the o-ring 30 and flat seal 32 within channels 31 and 33 respectively, and consequently between the mount 10 and the body panel 500, to form redundant, leak-proof seals around aperture 501. Horn base 102 can be fastened directly to the mount 10 with screws 46, 48 that are screwed into holding pins 47, 49. Alternatively, other fasteners such as cooperating nuts and bolts may be used to fasten the base 102 to the mount 10. The mount 10 also includes component mounting stud 22 which includes stud seal 24 to prevent air from leaking out between the mounting stud 22 and the horn base air tube 23 when air is blown through the longitudinal bore 26 of the mount 10.

Figure 3:
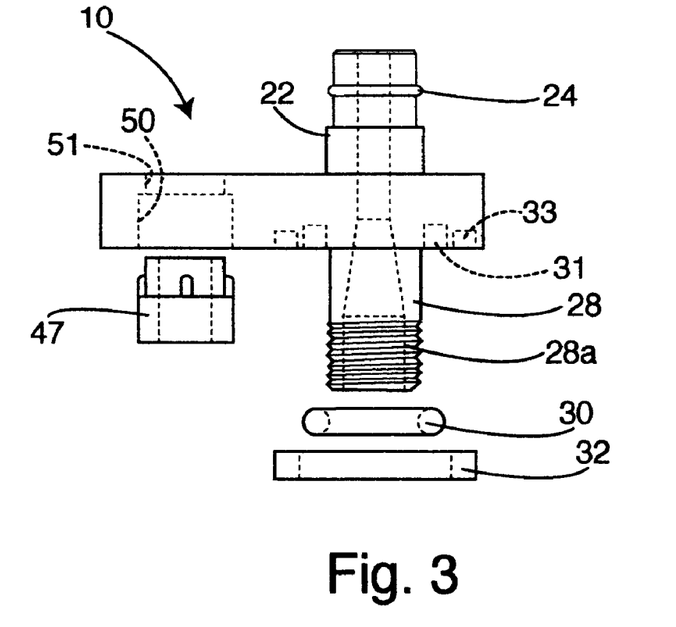
FIG. 3 is a side plan view of the mount.
Figure 4:
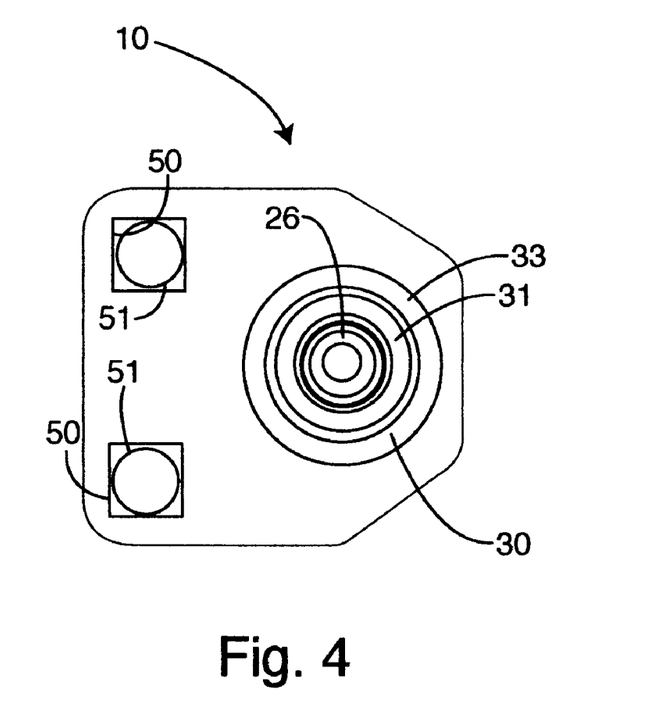
FIG. 4 is a bottom plan view of the mount.

A leak proof mount 10 according to a preferred embodiment of the present invention is illustrated in further detail in FIGS. 2, 3, and 4. The mount 10 includes a component mounting stud 22 surrounded by an o-ring 24, or other sealing structure readily appreciated by those skilled in the art, to prevent fluids from leaking past mounting stud 22 into the internal cavities of a mounted component 100. In FIGS. 2, 3, and 4, the mounted component is the base of a trumpet horn; however, the mounted component could also be a light, a speaker, or any type of accessary mounted to vehicle body panels. The mount 10 further includes a tapered internal bore 26 defined by the mount 10 and extending from the mounting stud 22 through to the lower stud 28. The longitudinal bore may also be of uniform diameter as depicted at 126 in FIGS. 8 and 9 in applications not requiring cooperation with an air supply fitting (not shown). The uniform longitudinal bore 26 applications may be used in conjunction with lighting components (not shown) where electrical wires (not shown) must be disposed through an aperture in a panel from an interior portion of the vehicle to the exterior environment, while preventing fluids from leaking through the aperture.

As depicted in FIG. 2, a portion of the longitudinal bore 26 may be internally threaded to receive externally threaded male fittings (not shown), such as air line fittings associated with truck air horns. Threads 28a on the lower stud 28 receive fastening nut 29.

O-ring 30 is disposed in channel 31, and flat seal 32 is disposed in channel 33. Other sealing structures equivalent to the o-ring and flat seals, as will be readily appreciated by those skilled in the art, are interchangeable with the seals of the preferred embodiment. Additional sealing structures, concentric or otherwise, may be used to provide additional sealing protection. A second o-ring, or conventionally equivalent sealing structure, 32 is associated with fastening nut 29. This o-ring 34 may be positioned adjacent to or integrated with the fastening nut 29 in a variety of manners which will be readily appreciated by those skilled in the art. The sealing structure 34 may also be of the type that provides additional locking strength to hold the nut 29 locked against panel 500. The mount 10 is preferably constructed of high density polyethylene, however, other plastics, or other materials, such as metal alloys or pure metals may be used to construct this item.

The fastening nut 29 may be constructed of materials such as plastic, metal, alloys, or the like, depending on the structural requirements of the application.

With reference to FIGS. 2 and 3, the mount 10 includes two receiving holes 50 that are configured to receive flanged holding pins 47, 49. The holding pins are designed to receive component fastening screws 46, 48 which secure the component to the mount 10. In this configuration, the holding pins 47, 49 resist rotational translation when engaged by the component fastening screws 46, 48. The flanged portion 51 of the receiving hole 50 engages the holding pins 47, 49 to hold the component down against the mount 10.

There are a variety of different fastening configurations that would provide stable attachment of the component to the mount 10. The mount 10 may also have any number of receiving holes in a variety of configurations, depending on the required structural support of the component 100.

Operation

Figure 5:
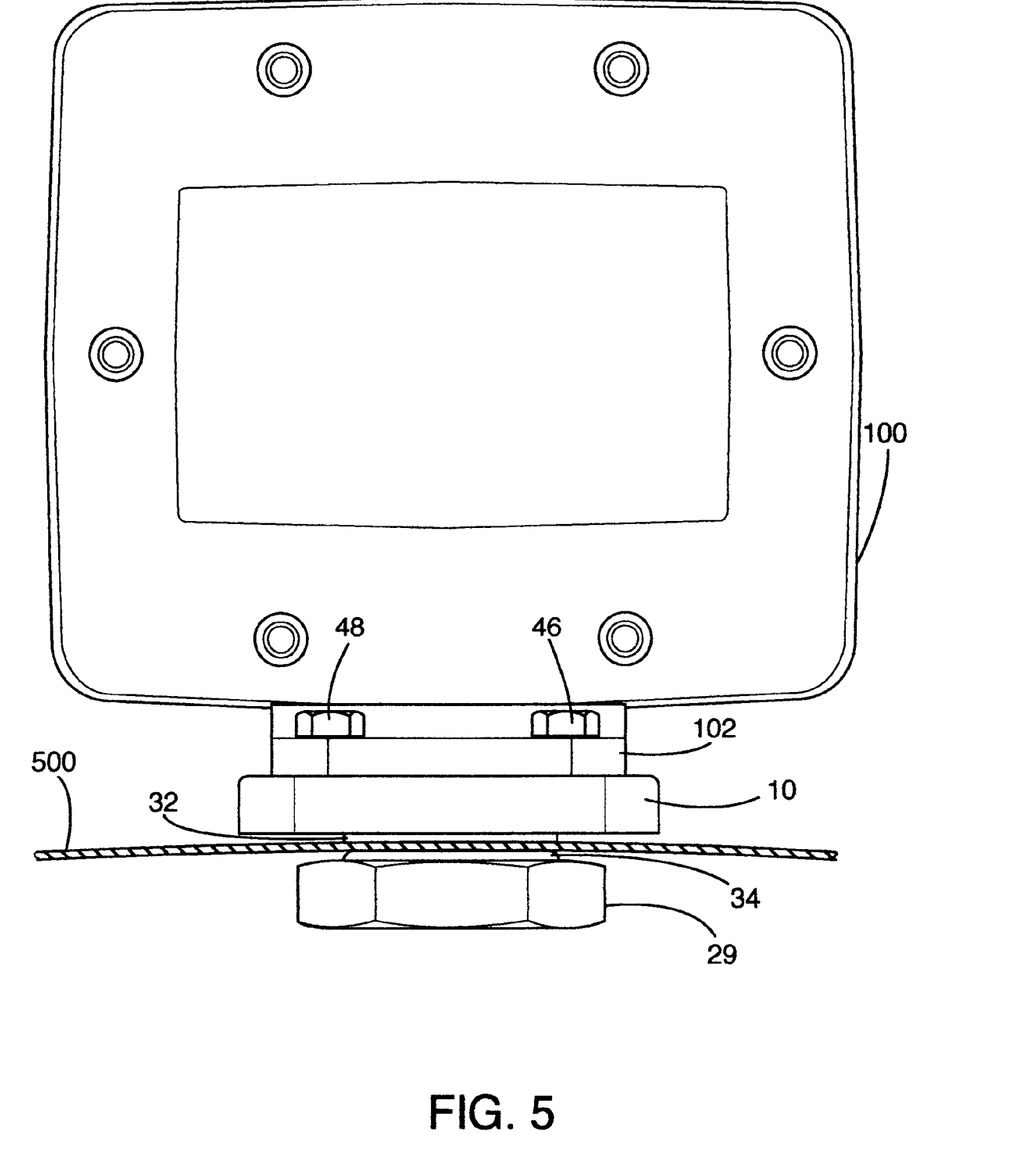
FIG. 5 is a rear plan view of the mount and a horn base.

The operation of the preferred embodiment to sealably secure a component to a body panel will now be described. Shown collectively in FIGS. 2, 5, and 6, the fitting is displaced through aperture 501 defined by a vehicle panel 500. Fastening nut 29 is threaded onto the threaded portion of the stud 28 and tightened, consequently compressing seals 30, 32 against panel 500 and forming a leak proof seal around aperture 501.

Figure 6:
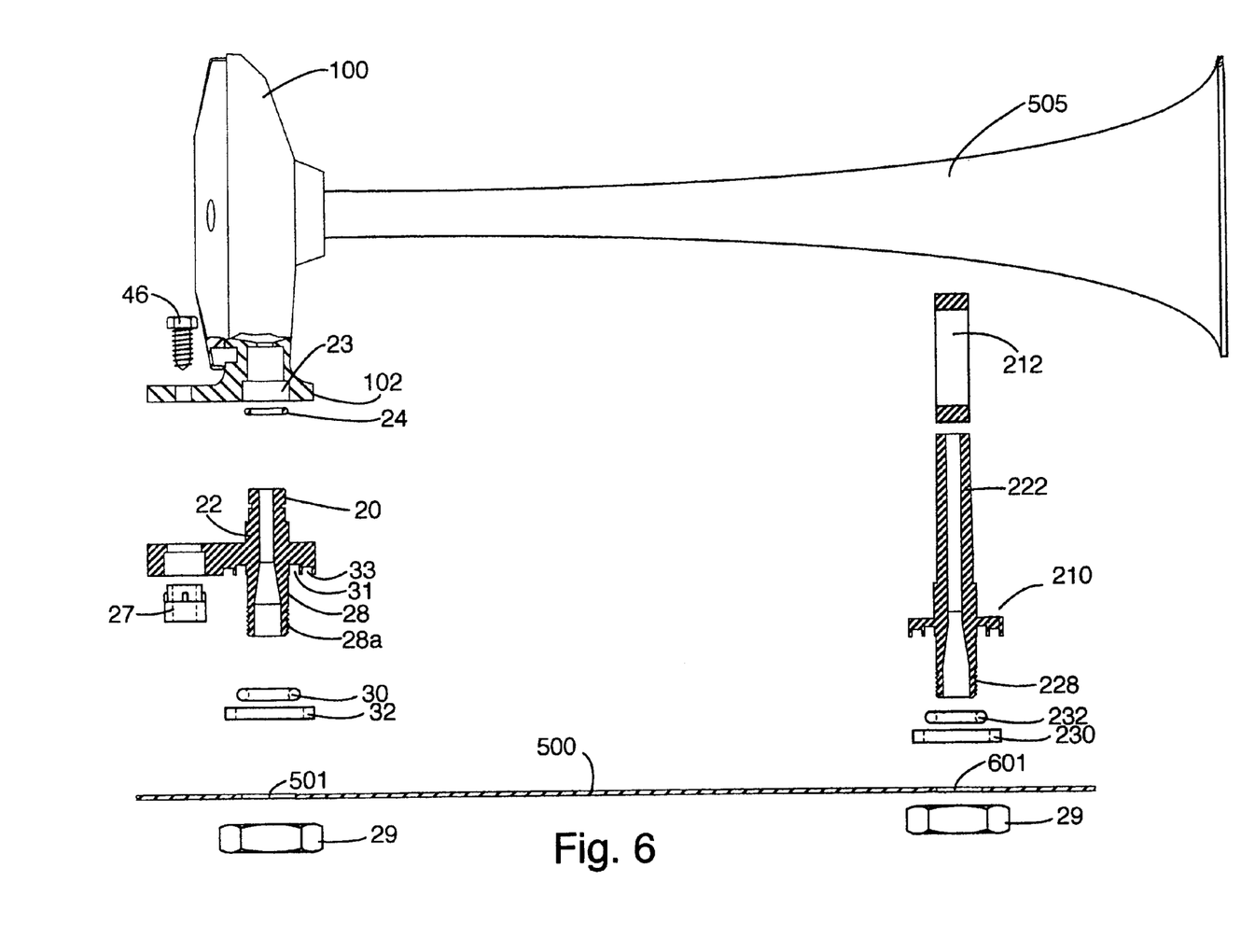
FIG. 6 is a sectional view of a horn mounted on a vehicle panel using the mount of the present invention.

As depicted in FIGS. 2 and 6, the horn base 102 is mounted to the mount 10 with mounting screws 46, 48 cooperatively received by holding pins 47, 49. Accordingly, the component 100 may be completely mounted to the mount 10 without requiring access to the fitting components on both sides of panel 500. Seal 24 on component stud 22 prevents the leakage of any fluid from the environment into the internal cavities of the component 100. Consequently, longitudinal bore 26 provides a leak proof passageway through mount 10 to provide fluid communication between opposing sides of the panel 500. As depicted in FIG. 2, a portion of the longitudinal bore 26 may be threaded to receive a fitting (not shown) connected to an air supply. For components, specifically horns, air is fed from the air supply (not shown) through the longitudinal bore 26, through the horn base air tube 23, and into the internal cavities of the component 100 to activate the horn.

Alternative Embodiments

A leak proof mounting body according to a first alternative embodiment of the present invention is illustrated in FIGS. 7, 8, 9, and 10. The mounting body 110 generally includes a fitting 120 and a mounting plate 140. The fitting 120 includes a component mounting stud 122 surrounded by a single o-ring 124. Threads 128, at the lower portion of fitting 120 receive fastening nut 129. The fitting 120 includes a flanged portion 133 surrounding the fitting.

The flanged portion 133 is in the form of a hexagonal nut, and is received and secured by adhesives in an equally configured but slightly larger aperture 148 defined by the mounting plate 140. In this configuration, the nut shaped flange 133 does not translate rotationally relative to the mounting plate 140. Other configurations will be appreciated by those skilled in the art to secure the fitting to the mounting plate and prevent translation of the fitting relative to the mounting plate.

O-ring 130 is disposed proximate to the fitting flange 133. Other sealing structures, such as flat washer seals and the like, may be interchanged with the o-ring. A second o-ring, or conventionally equivalent sealing structure, 132 is associated with fastening nut 129. This o-ring 132 may be positioned adjacent to or integrated with the fastening nut 129 in a variety of manners which will be readily appreciated by those skilled in the art.

Figure 7:
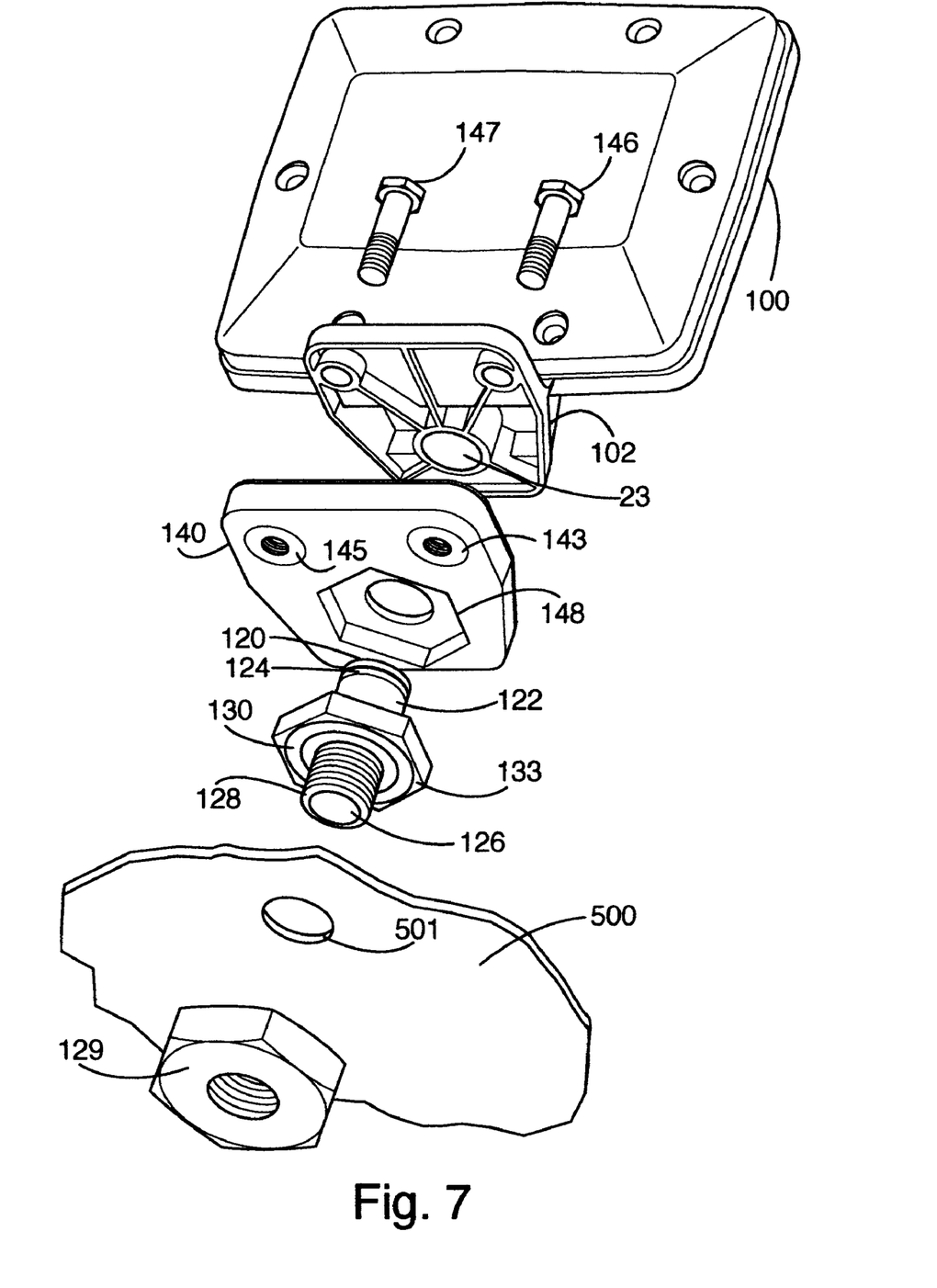
FIG. 7 is a perspective view of an alternative embodiment of the mount.
Figure 8:
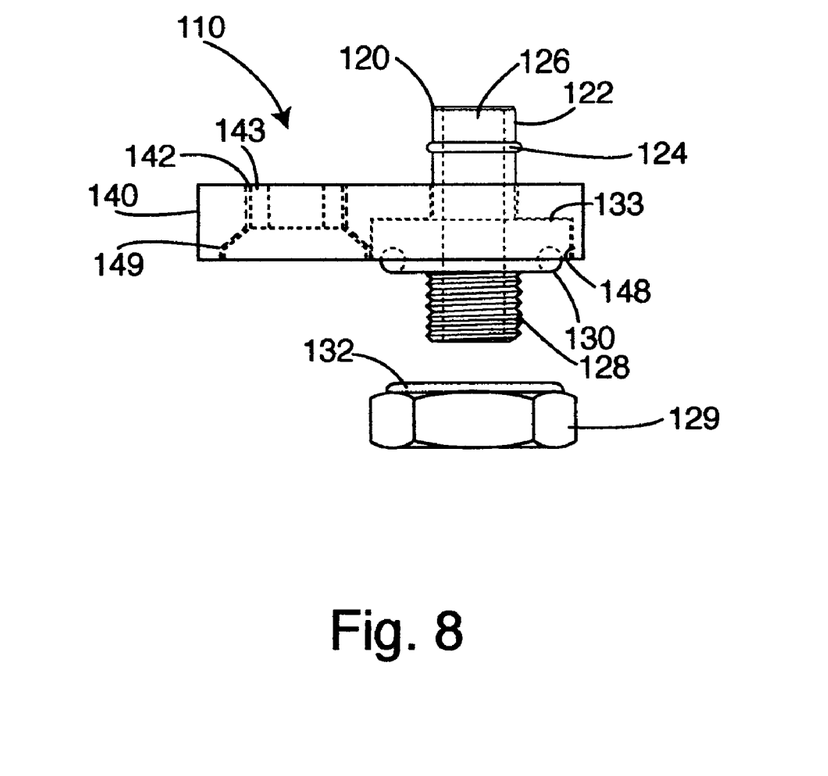
FIG. 8 is a side plan view of an alternative embodiment of the mount.
Figure 9:
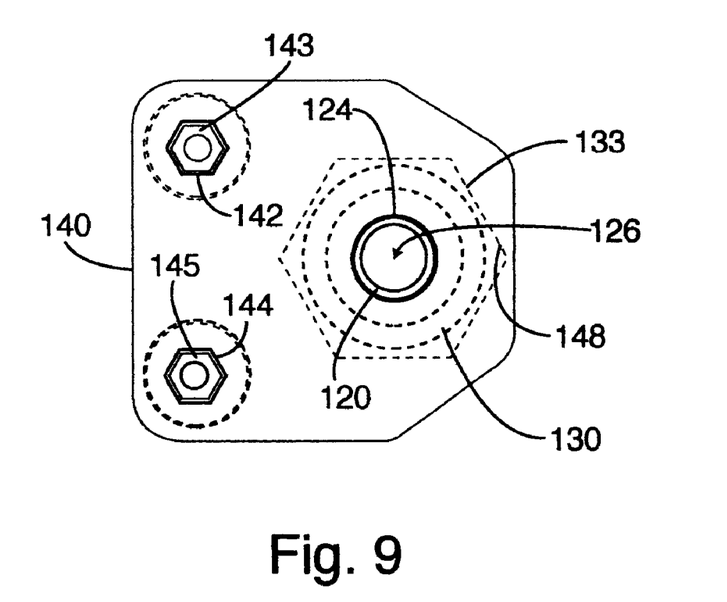
FIG. 9 is a top plan view of an alternative embodiment of the mount.

As best illustrated in FIGS. 7, 8, and 9, the mounting plate 140 is generally a planar plastic body; however, it also may be constructed of materials other than plastic, such as metal, alloys, or other materials, depending on the structural requirements of the application.

With reference to FIGS. 7, 8, and 9, the mounting plate 140 of the first alternative embodiment includes two component mounting receiving holes 142, 144 that are configured in flanged hexagonal shapes having a flanged portion 149 to receive flanged, hexagonally shaped fastening nuts 143, 145. The fastening nuts are designed to receive component fastening bolts 146, 147 which secure the component 100 to the mounting plate 140. In this configuration, the hexagonal nuts 143, 145 resist rotational translation when engaged by the component fastening bolts 146, 147. As depicted in FIG. 9, the flanged portion 149 of the receiving hole engages the flanged fastening nuts 143, 145 to hold the component down against the mounting plate 140. There are a variety of different fastening configurations that would provide stable attachment of the component to the mounting plate. The mounting plate 140 may also have any number of receiving holes in a variety of configurations, depending on the required structural support of the component 100.

Figure 10:
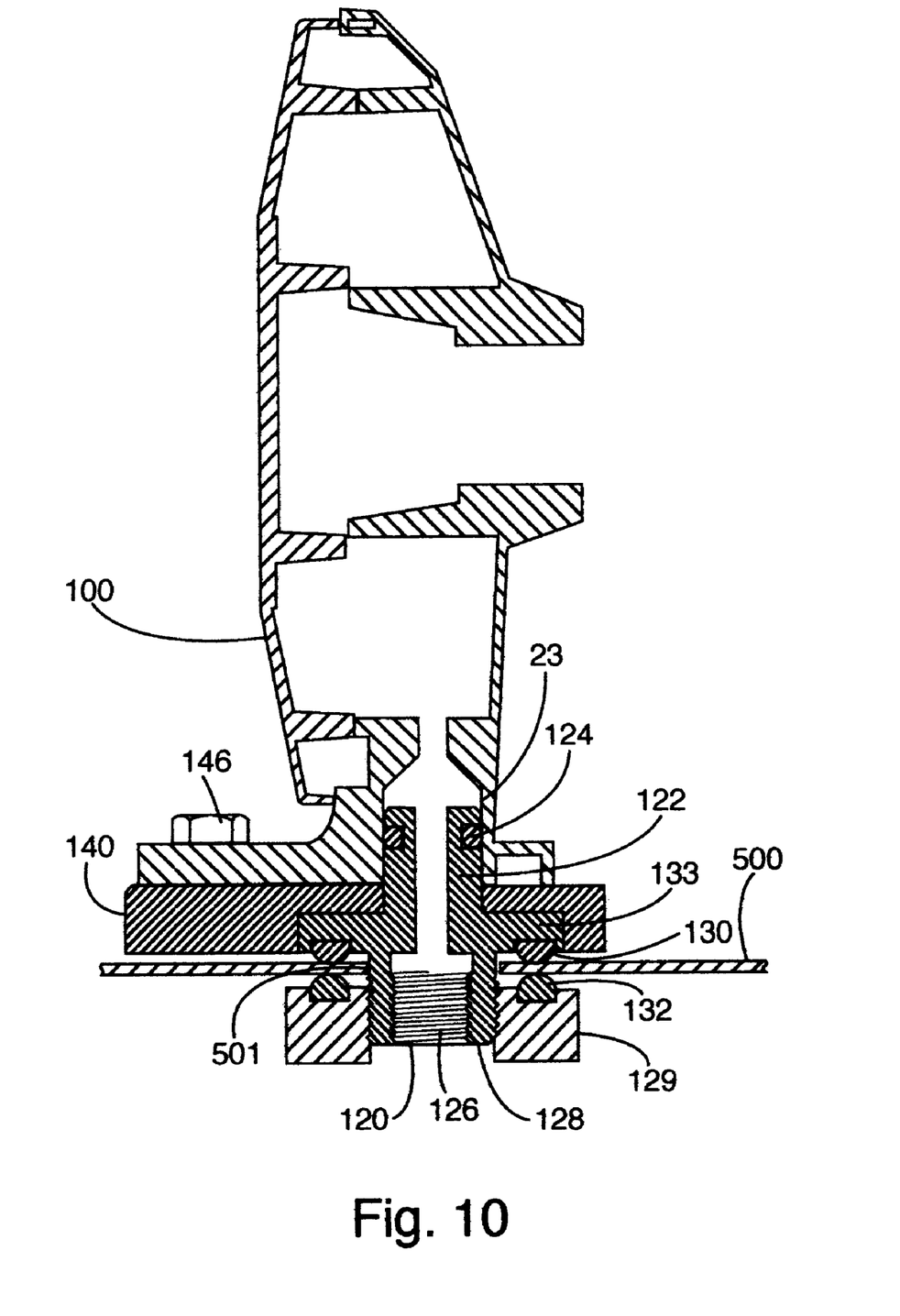
FIG. 10 is a sectional view of an alternative embodiment of the mount.

The operation of the first alternative embodiment to sealably secure a component to a body panel is essentially identical to the operation of the preferred embodiment. Shown collectively in FIGS. 7 and 10, the fitting 133 is displaced through aperture 501. Fastener 129 is threaded onto lower stud 128 and tightened, consequently compressing seals 130, 132 against panel 500 and forming a leak proof seal around aperture 501. As depicted in FIGS. 7 and 10, the horn base 100 is mounted to the mounting plate 140 by mounting bolts 146, 147 cooperatively received by fastening nuts 143, 145. Accordingly, the component 100 may be completely mounted to the mounting plate and fitting without requiring access to the fitting components on both sides of panel 500. As depicted in FIG. 10, a portion of the internal bore 126 may be threaded to receive a fitting (not shown) connected to an air supply. For components, specifically horns, air is fed from the air supply (not shown) through the fitting, through the internal bore 126, through the horn base air tube 23, and into the internal cavities of the component 100 to activate the horn.

A second alternative embodiment of the mount is depicted in FIG. 6 at 210. The extended component stud 222 includes a bracket 212 to receive the trumpet 505 of a horn and attach the trumpet 505 to the mount 210 and consequently the body panel 500. Redundant seals 230, 232 act to seal around the aperture 601 as in the preferred embodiment. In operation, this embodiment is used to affix a component here, the trumpet 505, to a body panel with or without providing communication via an internal bore between opposing sides of the panel. This configuration does not require an elaborate screw fastener/holding pin cooperation to secure a component base to the mount.

Figure 11:
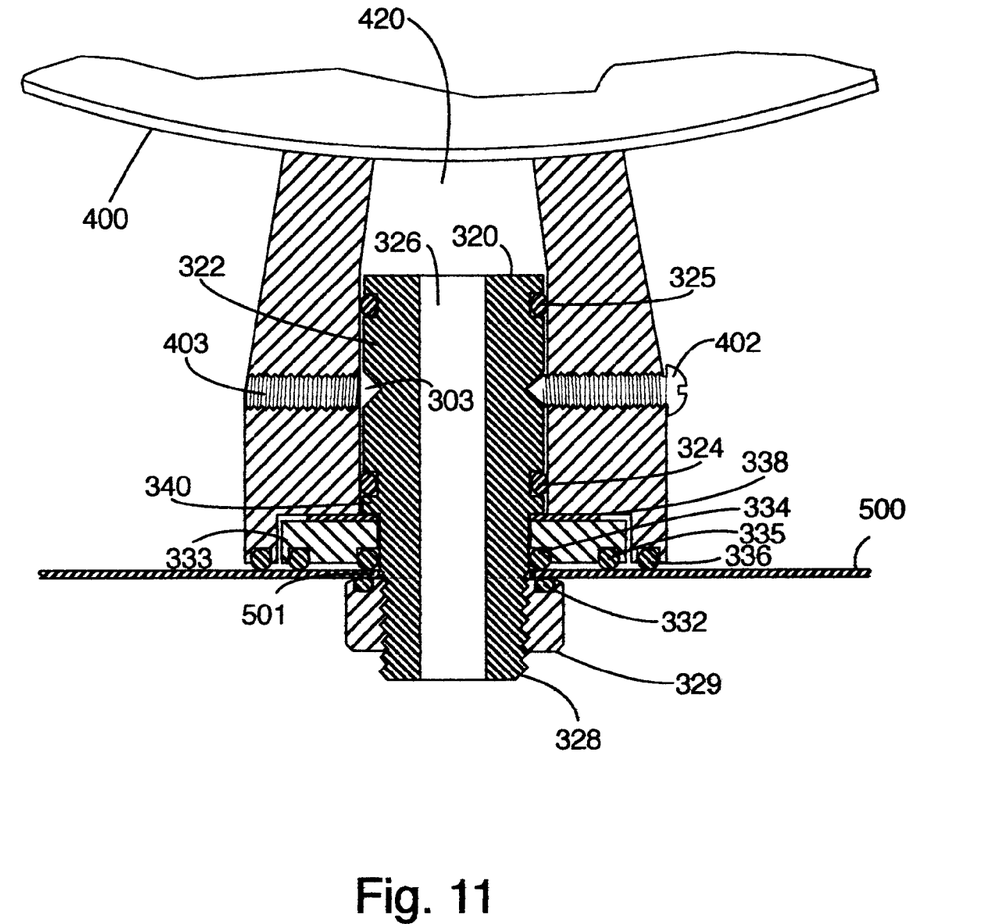
FIG. 11 is a sectional view of a second alternative embodiment of the mount.

In a third alternative embodiment, as depicted in FIG. 11, a component is mounted directly to a fitting. The fitting 320 is a longitudinal body having a longitudinal bore 326, which as in the preferred embodiment, may be threaded, or similarly constructed to readily couple to attachments such as air lines. The fitting 320 is generally a longitudinal cylinder having a stud portion 322, a lip 340, and a threaded fastening portion 328. Disposed on the stud portion 322, are receiving indents 303 which may circumferentiate the fitting, or be provided at discrete positions. Fastening set screws 402 thread through the component 400 in apertures 403 and fasten the component to the fitting 320 as the set screws 402 set into the receiving indent 303. A variety of different fastening structures will be readily appreciated by those skilled in the art for attaching the component 400 to the fitting 320 in place of the set screw arrangement.

O-ring seals 324, 325 are circumferentially disposed within holding valleys of the component stud 322 to prevent water from entering through the set screw receiving apertures 403 and transferring to either the internal portion of the component 420 or the lower threaded portion of the fitting 328.

With reference to FIG. 8, threaded portion 328 receives fastening nut 329. Coupled to or integral with fastening nut 329 is o-ring 332. Notably, the threaded portion 328 may be of various configurations which allow the fitting to be secured to the panel. Additionally, the o-ring may be substituted with any sealing structure. The fitting is surrounded by washer 333. The washer 333 has associated therewith or adjacent thereto on its top surface a flat sealing structure 338 which abuts fitting lip 340. This sealing structure 338 prevents any fluids that may pass by o-ring 324 from seeping through aperture 501 defined by the panel 500. Redundant seals 334, 335 are disposed on the lower surface of washer 333. Notably, redundant seal 334 abuts both the washer and sealably surrounds the fitting 320. As additional sealing protection, seal 336 may be associated with component 400. Redundant seals 334, 335, 336 and 338 may be of a variety of different structures and cross sections, and may be associated with, displaced on, or integral with the washer or component, or fitting, in a variety of combinations as will be appreciated by those skilled in the art.

The third alternative embodiment of FIG. 8 operates in a manner similar to that described above for the preferred embodiment. Component stud portion 322 includes set screw indents 303. Set screws 402 screw into component 400 in apertures 403 and cooperatively engage the set screw indents 303 to secure the component 400 to the fitting 320. Seals 324 and 325 prevent any fluids which pass through apertures 403 from leaking farther than the o-rings 324, 325, such as into the internal cavities of the component. Fastener 329 is threaded onto threaded portion 328 to secure the fitting and consequently the component to the body panel 500. Washer 333, which includes seals 334, 335, and 338 prevent fluids from passing from the environment through aperture 501. Component 400 may also be outfitted with redundant seal 336 to further prevent leakage of fluids from the environment through aperture 501.

The above descriptions are those preferred embodiments of the invention. Various alterations or changes can be made without departing from the spirit and broader aspects of the invention as defined in the appended claims. Any reference to claim elements in the singular, for example, using the articles "a" "and" "the" or "said" is not to be construed as limiting the element to only one element unless so specifically stated. The claims are to be interpreted in accordance with the principles of patent law, including the doctrine of equivalents.

The embodiments of the invention in which an exclusive property or privilege is claimed are defined as follows:

1. A leak proof mount for attaching a component to a panel comprising:
    a base body;
    an attachment portion extending from said base body, disposable through an aperture defined by a panel;
    a first fastener adapted to cooperatively engage said attachment portion and secure said base body to a panel
    a seal disposed around the attachment portion; and
    a mounting plate joined with said body and adapted to compress the seal against the panel, said mounting plate including a second fastener adapted to receive a complimentary fastener and secure a component to said mounting plate without penetrating the panel.

2. The leak proof mount of claim 1 wherein said attachment portion is threaded.

3. The leak proof mount of claim 2 wherein said first fastener is a threaded nut tightenable on said attachment portion.

4. The leak proof mount of claim 3 wherein said seal is selected from the group consisting of an o-ring, a washer, and a flat seal.

5. An apparatus for providing a point of attachment to mount a component to a body panel comprising:

a body partially disposable through an aperture defined by a body panel;

a washer including a first surface and a second surface, said washer disposed on said body;

a seal adapted to form a leak proof seal around an aperture defined by a body panel when said body is placed through the aperture;

a first fastener adapted to couple to said body and secure said body to a body panel;

a mounting plate joined with said body and adapted to compress the seal against the panel, said mounting plate including a second fastener adapted to receive a complimentary fastener and secure a component to said mounting plate without penetrating the panel; and a second seal disposed on said second surface to form a leak proof seal between said washer and said mounting plate.

6. The apparatus of claim 5 comprising at least one detent on said body and at least one set screw associated with the component whereby the set screw engages said detent to secure the component to the body.

7. The apparatus of claim 6 wherein said body includes a means for providing a leak proof seal between said body and a component whereby liquids are prevented from entering an internal cavity of the component.

8. The apparatus of claim 7 wherein said body includes a longitudinal bore.

9. A leak proof fitting for attaching a component to a panel defining an aperture comprising:

a body including a fastening portion adapted for displacement through an aperture defined by a panel;

a mounting plate surrounding and extending outwardly from at least a portion of said body, said mounting plate defining a fastener aperture configured to capture a first fastener element and prevent rotation of the first fastener element, said first fastener element adapted to cooperate with a second fastener element and secure a component to the mounting plate without penetrating the panel; and a leak-proof seal disposed around said fastening portion and positioned to sandwich between the mounting plate and a panel when the fastening portion is positioned through an aperture defined by a panel.

10. The leak proof fitting of claim 9 further comprising a nut adapted for coupling to said fastening portion when said fastening portion is disposed through an aperture defined by a panel.

11. The leak proof fitting of claim 9 wherein a nut is adapted to secure said body to a panel.

12. The leak proof fitting of claim 9 further comprising a second leak proof seal disposed adjacent a nut and adapted to sealably engage said nut and a panel when said body is secured to a panel.

13. The leak proof fitting of claim 9 further comprising a third leak proof seal disposed around said coupling portion adapted to provide sealing cooperation between said body and a component mounted on said body, whereby fluids are prevented from entering the component from the environment.

14. The leak proof fitting of claim 9 wherein said first fastener element is a plastic holding pin configured to conform to the fastener aperture.

15. The leak proof fitting of claim 9 comprising a lip that extends into the fastener aperture, said lip adapted to engage the first fastener element and prevent the first fastener element from withdrawing from the fastener aperture.

16. The leak proof fitting of claim 9 wherein said body includes a coupling portion adapted to sealably engage the component.

17. The leak proof fitting of claim 9 wherein the first fastener element is substantially concealed by the mounting plate when the first fastener element is disposed in the fastener aperture and the fastening portion is positioned through the aperture defined by the panel.

18. A leak proof mount for attaching a component to a panel comprising:

a base including a lower portion adapted to extend through an aperture in a panel;

a flange radially extending from said base;

a mounting plate defining a recess mounted over said base so that said flange is substantially received in said recess, said recess configured to prevent rotation of the mounting plate relative to the flange, said mounting plate defining an aperture to receive a fastener to mount a component to the mounting plate without penetrating the panel with the fastener; and a seal positioned adjacent said flange and adapted to sealably engage the flange.

19. A vehicle horn comprising:

a trumpet;

a stud having a lower portion and an upper portion, said lower portion adapted to extend through a vehicle panel, said upper portion adapted to receive said trumpet thereon, said stud defining an internal passageway opening through said upper and lower portions;

upper sealing means for providing an air-tight seal between said upper stud portion and said trumpet;

lower sealing means for providing a water-tight compression seal between said lower stud portion and the vehicle panel; and a mounting plate joined with said stud, said mounting plate including means for fastening said trumpet to said mounting plate without penetrating the vehicle panel.

* * * * *